(12) United States Patent
Kishibe et al.

(10) Patent No.: US 6,541,939 B2
(45) Date of Patent: Apr. 1, 2003

(54) MOTOR CONTROLLER

(75) Inventors: Taro Kishibe, Hyogo (JP); Yasufumi Ikkai, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/813,756

(22) Filed: Mar. 21, 2001

(65) Prior Publication Data

US 2002/0109479 A1 Aug. 15, 2002

(30) Foreign Application Priority Data

Mar. 21, 2000 (JP) .................................... 2000-077612

(51) Int. Cl.$^7$ .................................................. H02P 5/28
(52) U.S. Cl. ........................ 318/799; 318/439; 318/254; 318/138; 318/798
(58) Field of Search ................. 318/799, 439, 318/254, 138, 798

(56) References Cited

U.S. PATENT DOCUMENTS

| | | | |
|---|---|---|---|
| 5,608,300 A | * | 3/1997 | Kawabata et al. .......... 318/254 |
| 5,729,102 A | * | 3/1998 | Gotou et al. ................. 318/254 |
| 5,739,651 A | * | 4/1998 | Miyazawa et al. .......... 318/254 |
| 5,845,045 A | * | 12/1998 | Jeske et al. ................. 318/254 |
| 5,969,496 A | * | 10/1999 | Yamada et al. ............. 318/138 |
| 6,157,150 A | * | 12/2000 | Konecny .................... 318/138 |
| 6,242,875 B1 | * | 6/2001 | Kusaka et al. .............. 318/138 |

* cited by examiner

*Primary Examiner*—Rita Leykin
(74) *Attorney, Agent, or Firm*—RatnerPrestia

(57) ABSTRACT

A motor controller drives a motor based on signals from commutation sensors (CS signals.) This controller includes (a) a pole position detector for detecting a rotor pole position with edges of the CS signals; (b) a speed detector for detecting a motor speed based on a time interval between the edges of the CS signals; (c) a pole phase detector for estimating a position angle of the rotor based on an output from the position detector and an output from the speed detector; and (d) a phase limiter for restraining the estimated position angle from advancing over a given value. When the limiter continues operating for a certain interval, the controller switches the motor from sine wave driving to rectangular wave driving. This structure allows this controller to drive the motor stably when the motor speed is abruptly changed in the sine wave driving or under field weakening control.

20 Claims, 15 Drawing Sheets

MOTOR CONTROLLER

FIELD OF THE INVENTION

The present invention relates to a motor controller suitable for a motor of an electric vehicle, a geared motor or the like. More particularly, it relates to a motor controller employing commutation sensor signals (hereinafter referred to as CS signals) which indicate a position of a rotor pole of a motor, and this controller drives the motor in a sine wave or performs field weakening control. The motor controller keeps on driving the motor in a stable manner even if the motor changes its speed abruptly.

BACKGROUND OF THE INVENTION

Recently, efficiency of motors has drawn attention in the market from the view of environment protection due to energy saving. In this climate, induction motors have been replaced with dc motors employing magnets. Among other dc motors, a brushless dc motor using a magnet in the rotor section has become a main stream because it is a maintenance free item.

In order to drive a brushless dc motor efficiently and smoothly, the following control method is employed: A sine wave current-in phase with a back electromotive force produced in a driving coil by magnet-flows through the driving coil, when the motor is driven. In this control method, a position angle of the rotor must be exactly measured. A motor for factory automation and a motor for electric vehicle employ an encoder or a resolver which is widely used as a detector for a rotor position angle. These detectors can produce a resolution of more than 1000 pulses per rotation; however, they are very expensive. On the other hand, a commutation sensor (CS), which detects only a pole position of a rotor magnet, is also used in general. This CS produces a resolution of 12 pulses per rotation in a case of a motor having 4 poles and 3 phases; however, measuring the time between pulses allows the CS to estimate a rotor-position-angle as accurately as the encoder or the resolver measures.

However, in these conventional motor controllers, the following problem occurs when a geared motor, having a gear on an output shaft, encounters a large acceleration or reduction in speed. To be more specific, when the geared motor is in the application where the motor encounters back rush via the gear, or the motor is reversely rotated by external force, the motor produces vibration or cannot be controlled. Because an error of estimating a rotor position angle becomes large, and only a torque smaller than a torque designated can be produced, or current is flowed so that a reversal torque is produced.

SUMMARY OF THE INVENTION

The present invention addresses the problem discussed above and aims to provide a motor controller which keeps on driving the motor in a stable manner even when the motor changes its speed abruptly.

The motor controller of the present invention drives a motor based on a commutation sensor signal (CS signal) and comprises the following elements:

(a) a pole position detector for detecting a pole position of a rotor by using edges of CS signals;
(b) a speed detector for detecting a motor speed by using a time interval between edges of the CS signals;
(c) a pole phase detector for estimating a rotor-position-angle based on an output from the speed detector and an output from the pole position detector; and
(d) a phase limiter for restraining an estimated position angle of the rotor from advancing over a predetermined value when the motor reduces its speed abruptly.

This structure allows the motor controller to drive the motor in a stable manner even when the motor reduces its speed abruptly.

Another motor controller of the present invention comprises the following elements:

(a) a pole position detector for detecting a pole position of a rotor by using edges of CS signals;
(b) a speed detector for detecting a motor speed by using a time interval between edges of the CS signals;
(c) a pole phase detector for estimating a rotor-position-angle based on an output from the speed detector and an output from the pole position detector; and
(d) a phase reseter for correcting a deviation of an estimated position angle of the rotor when the motor accelerates its speed abruptly.

This structure allows the motor controller to drive the motor in a stable manner even when the motor accelerates its speed abruptly.

Still another motor controller of the present invention comprises the following elements:

(a) a pole position detector for detecting a pole position of a rotor by using edges of CS signals;
(d) a monitor for recognizing motor's rotating status by using a pattern of the CS signals; and
(c) a motor drive mode switch for assigning one of a sine wave driving or a rectangular wave driving to the motor, When the monitor recognizes a rotation reverse to the rotation just before, the mode switch changes the sine wave driving to the rectangular wave driving.

This structure allows the motor controller to keep on driving the motor in a stable manner even when a motor speed is abruptly changed by external force, or when a geared motor encounters back rush via the gear provided to an output shaft.

DETAILED DESCRIPTION OF THE EXEMPLARY EMBODIMENTS

Exemplary embodiments of the present invention are demonstrated hereinafter with reference to the accompanying drawings.

First Exemplary Embodiment

Figure 1A:
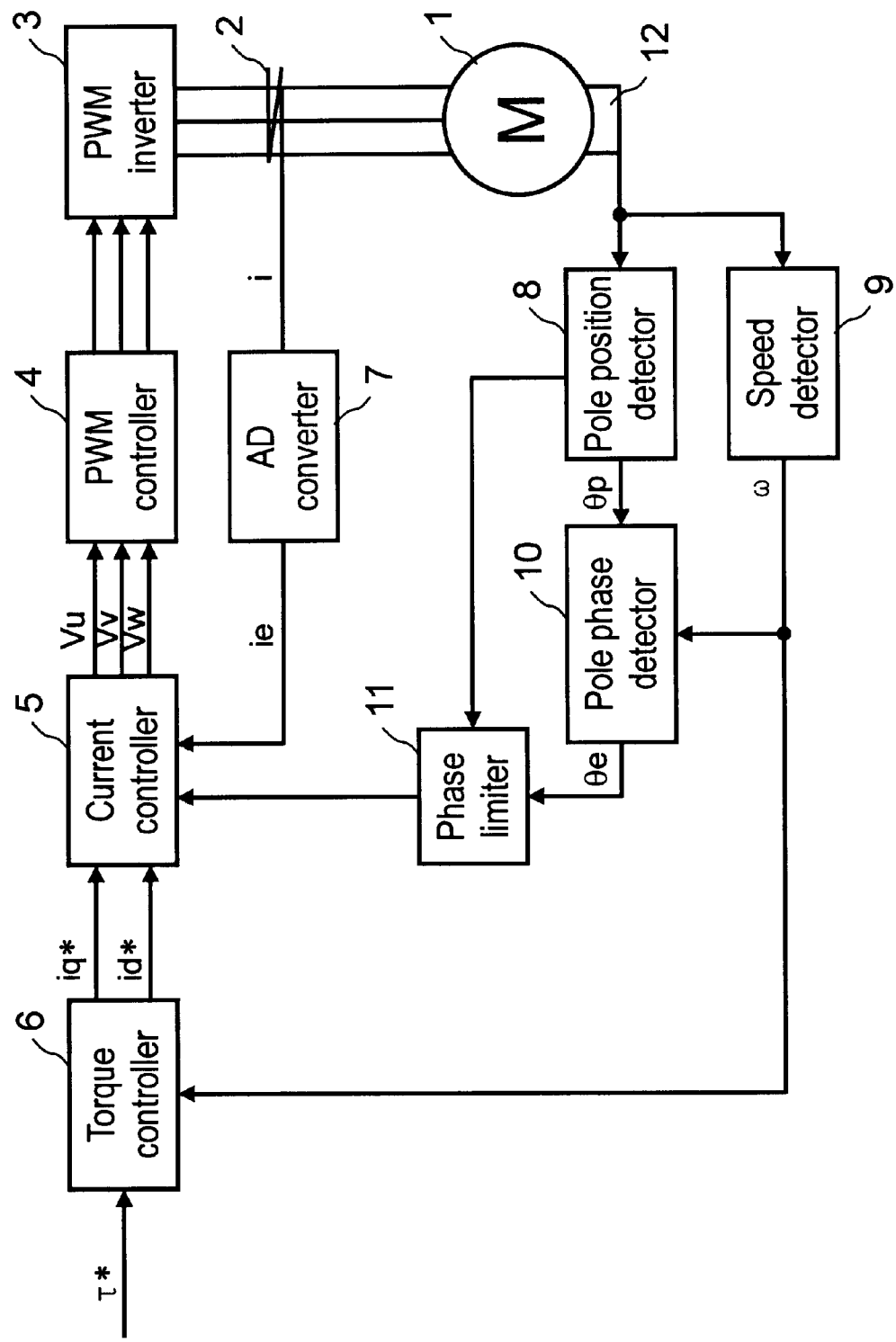
FIG. 1A is a block diagram illustrating a motor controller in accordance with a first exemplary embodiment of the present invention.
Figure 1B:
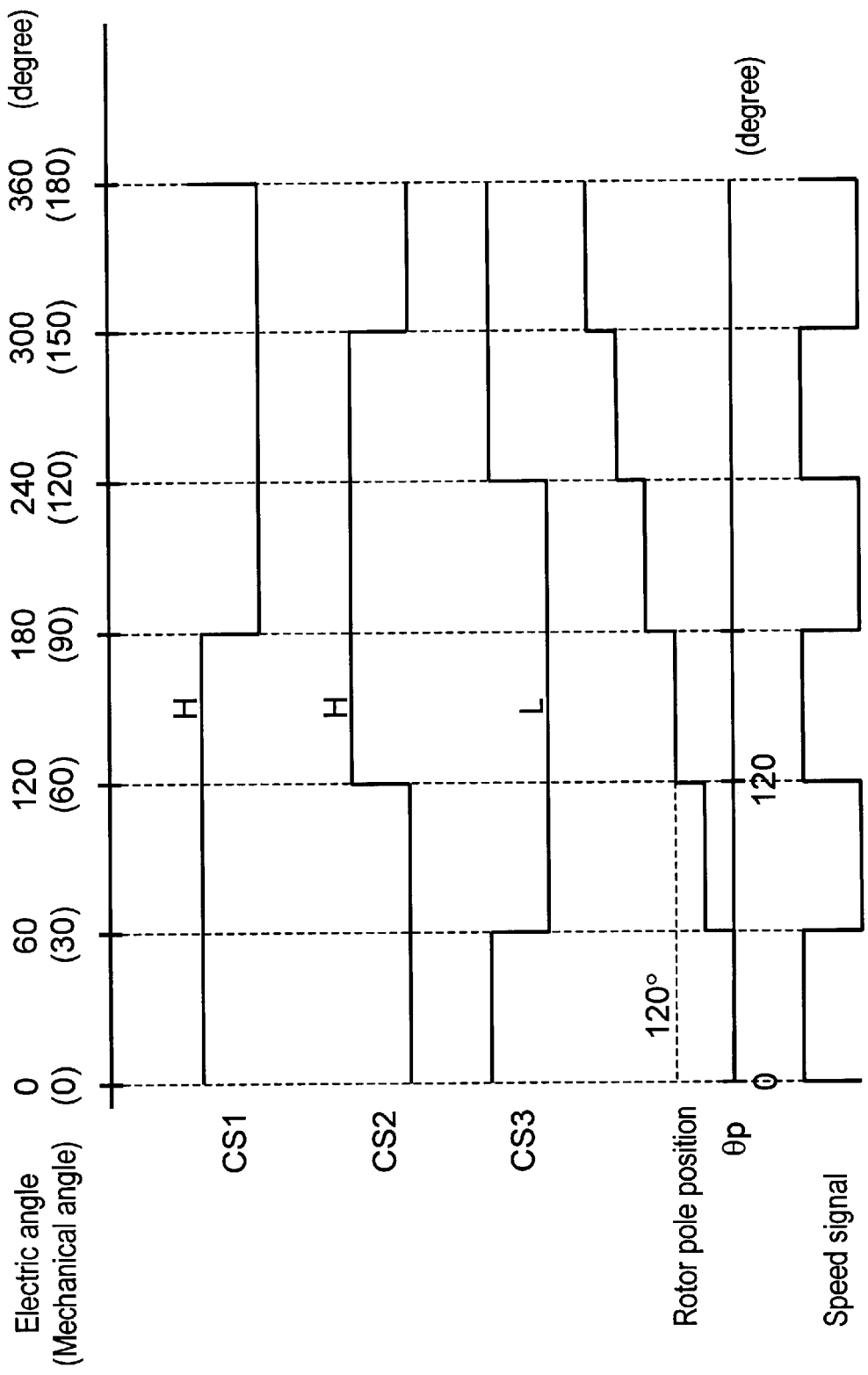
FIG. 1B schematically describes a pattern of CS signals, detection of a rotor pole position and a speed signal of the same controller shown in FIG. 1A.
Figure 2:
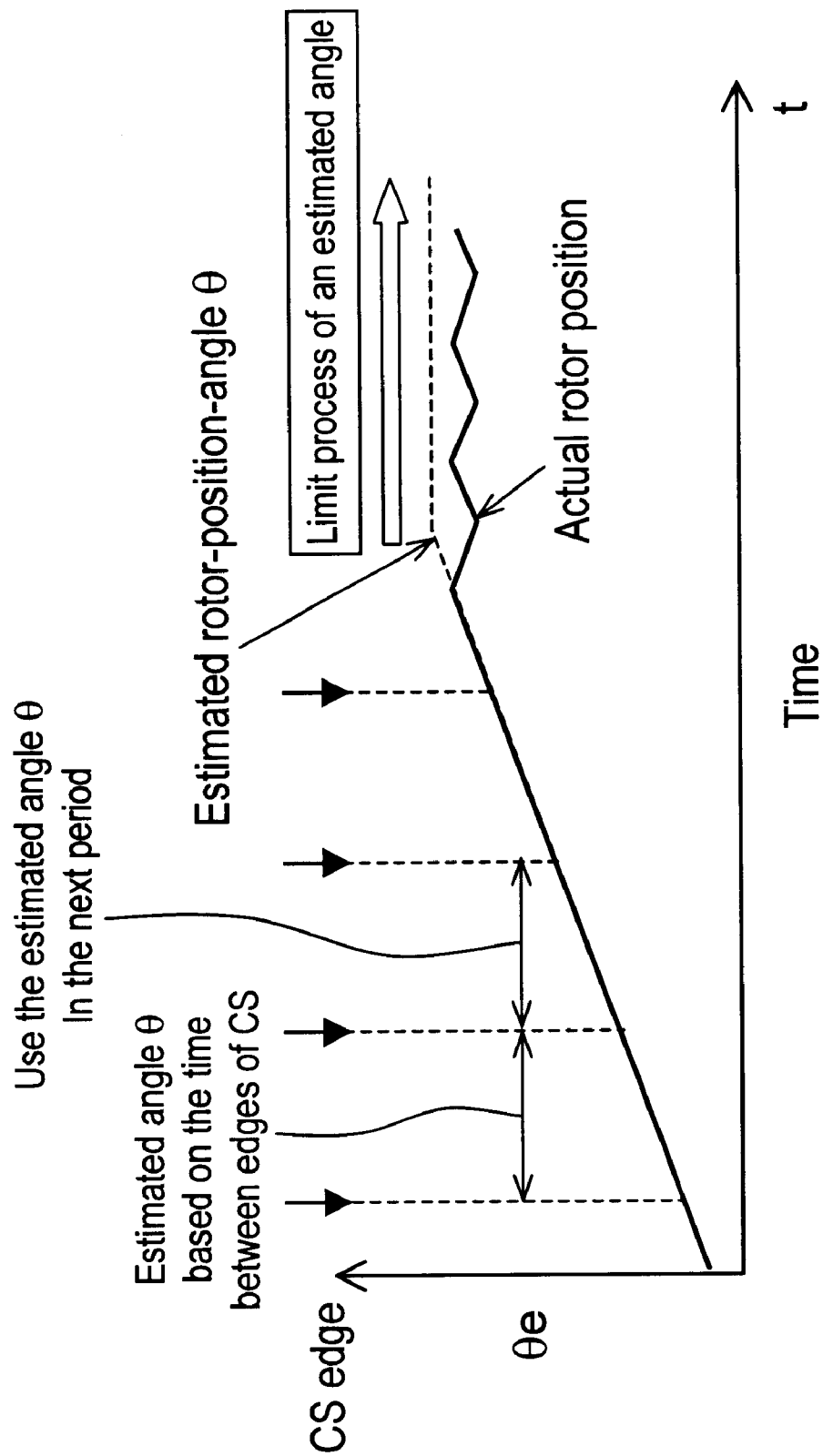
FIG. 2 schematically describes an operation of a motor of the controller shown in FIG. 1A.

FIG. 1A is a block diagram illustrating a motor controller in accordance with the first exemplary embodiment of the present invention. FIG. 1B schematically describes a pattern of CS signals detection of a rotor pole position and a speed signal of the same controller. FIG. 2 schematically describes an operation of a motor of the same controller.

The motor controller in accordance with the first embodiment controls a brushless dc motor 1 (hereinafter referred to as a motor.) Current transducer (CT) 2 detects motor current as a voltage. AD converter 7 converts an analog voltage value detected by CT2 into a digital value for a microcomputer to recognize.

Pulse width modulating (PWM) inverter 3 comprises a power transistor, e.g., an insulated gate type bipolar transistor. Regarding a structure of PWM inverter 3, in a case of a three-phase motor frequently used, six power transistors are full bridged. PWM controller 4 is a precircuit for driving the six power transistors, and inputs a control signal for on/off these power transistors into PWM inverter 3 via a photo coupler or the like. This photo coupler functions as an insulator between the circuit operating at a low voltage and the power transistors to which a high voltage is applied. Current controller 5 controls actual motor current detected by CT2 so that the motor current can be equal to a current value designated. Torque controller 6 converts a torque value designated into the current value designated.

A Motor control theory tells that "dq" converted coordinates is used to be the coordinates synchronized with rotating of a rotor. The current value designated is converted into iq* and id* through this "dq" conversion. In a case of a surface permanent magnet type motor (SPM), which does not use reluctance torque, id*=0. Current controller 5 compares two current values, i.e., one is two-phase "dq" converted current value designated and the other is two phase current value detected by CT2 and undergone the "dq" conversion. Then controller 5 converts the difference between these two current values into two phase voltage values, and finally outputs voltage values Vu, Vv, Vw-undergo 2 phases/3 phases conversion-to PWM controller 4.

Since the coordinates synchronized to rotating of the rotor undergo these "dq" conversion and 2 phase/3 phase conversion, an exact position angle of the rotor should be detected at the conversion. CS sensor 12, in a case of three phases, comprises CS1, CS2, CS3 corresponding to respective phases, and they are shifted by 120° electric angle with each other. Respective sensors output 'H' or 'L' depending on pole N or pole S of rotor magnet. For instance, in a case of a motor having 3 phases and 4 poles, each sensor outputs a signal having two 'H' periods and two 'L' periods, i.e., 2 pulses per rotation (360° mechanical angle). The 3 sensors output signals shifted by 120° electrical angle with each other. FIG. 1B illustrates this situation.

Pole position detector 8 detects a pole position of the rotor depending on a combination pattern of output signals from the three sensors, CS1, CS2 and CS3. An example of detecting the pole position of the rotor is described with reference to FIG. 1B.

When the motor rotates in a clockwise (CW) direction, CS1, CS2 and CS3 output 'H', 'L' and 'H' respectively while the rotor rotates from 0° to 60°. In the same manner, CS1, CS2 and CS3 respectively output 'H', 'L' and 'L' while the rotor rotates from 60 to 120 degree, and in the same manner, 120 to 180 degree: 'H', 'H' and 'L';
180 to 240 degree: 'L', 'H' and 'L';
240 to 300 degree: 'L', 'H' and 'H';
300 to 360 degree: 'L', 'L' and 'H'.

When CS signals are supplied, position detector 8 detects rotor pole position θp and holds it depending on a combination pattern of CS1, CS2 and CS3. For instance, when a CS pattern is 'H', 'H' and 'L', pole position θp takes 120°.

As discussed above, in a 3-phase motor, 3CSs supply signals 'H' and 'L' having difference of 120° electric angle with each other, therefore, 6 kinds of CS patterns per 360° electric angle are available. Thus a rotor position angle can be detected at an accuracy of 60° electric angle.

Speed detector 9 measures a time interval between, e.g., a rising edge and a falling edge of a speed signal. The speed signal is a composite signal of 3 output signals from respective CS1, CS2 and CS3, and 'H' alternates with 'L' at intervals of 60° electric angle. The time measured is converted to a time per rotation, and motor's rotational speed ω is found by taking its reciprocal.

Pole phase detector 10 calculates an angle of rotor rotating during a PWM cycle based on speed ω from a reference of pole position θp held as discussed above. The calculation result is added to θp to find an estimated rotor-position-angle θe.

Current controller 5 determines to power the motor or not using this estimated angle θe. Phase limiter 11 is disposed between current controller 5 and position detector 8, phase detector 10. Phase limiter 11 prevents estimated angle θe from advancing excessively.

An operation of the motor controller structured above is described hereinafter with reference to FIG. 2. First, when the motor speed is accelerated or reduced a little, or is rather stable, estimated rotor-position-angle θe is almost equal to an actual rotor-position-angle. Thus the motor can be driven in a stable manner.

However, when the motor speed is abruptly reduced due to external force or back rush by the gear disposed on an output shaft of the motor, a CS pattern signal is not input to pole position detector 8 for a period longer than an expected period. If nothing is happened in this case, pole-phase-detector 10 incrementally adds an angle found based on speed ω every PWM cycle regardless of supply of CS signals. Thus estimated angle θe becomes largely different from an actual rotor-position-angle. As a result, torque vibration occurs, and finally, the motor cannot be controlled. In this case, according to this first embodiment, phase limiter 11 is set so that estimated position angle θe is prevented from advancing excessively. This restrains the vibration of the motor, so that the motor can be driven in a stable manner.

The phase limiter is preferably set at 60° because, in the case of 3-phase motor, an angle between pulses of CS signals is 60 degree. When the motor vibrates a little, the phase limit value can be more than 60 degree, e.g., 80 degree is effective. In the case of interior permanent magnet type motor (IPM), among others, current flows in a condition that a phase is advanced by 30–40 degree from a back electromotive force waveform, so that the maximum torque can be generated. Thus if a limit value is set at a value by 30–40 degree greater than an expected value, negative torque will not be produced.

As discussed above, the first embodiment proves that a phase limiter, which prevents an estimated rotor-position-angle from advancing excessively, allows an inexpensive and strong CS to drive a motor in a sine wave mode, and vibration can be restrained as well as torque ripple can be lowered. In a geared motor encountering back rush between gears, the phase limiter allows the motor to be driven in a stable manner.

Second Exemplary Embodiment

Figure 3:
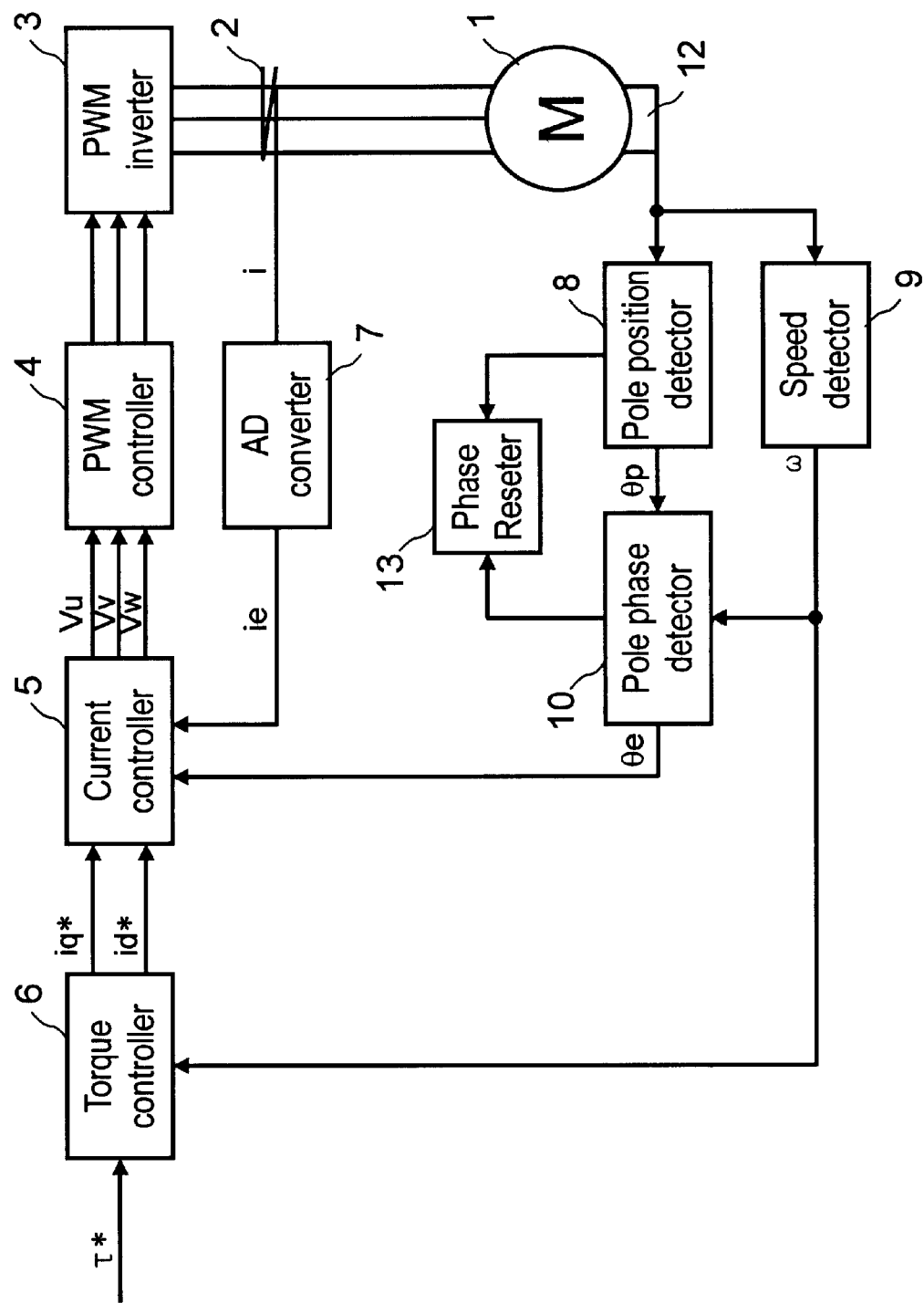
FIG. 3 is a block diagram illustrating a motor controller in accordance with a second exemplary embodiment of the present invention.
Figure 4:
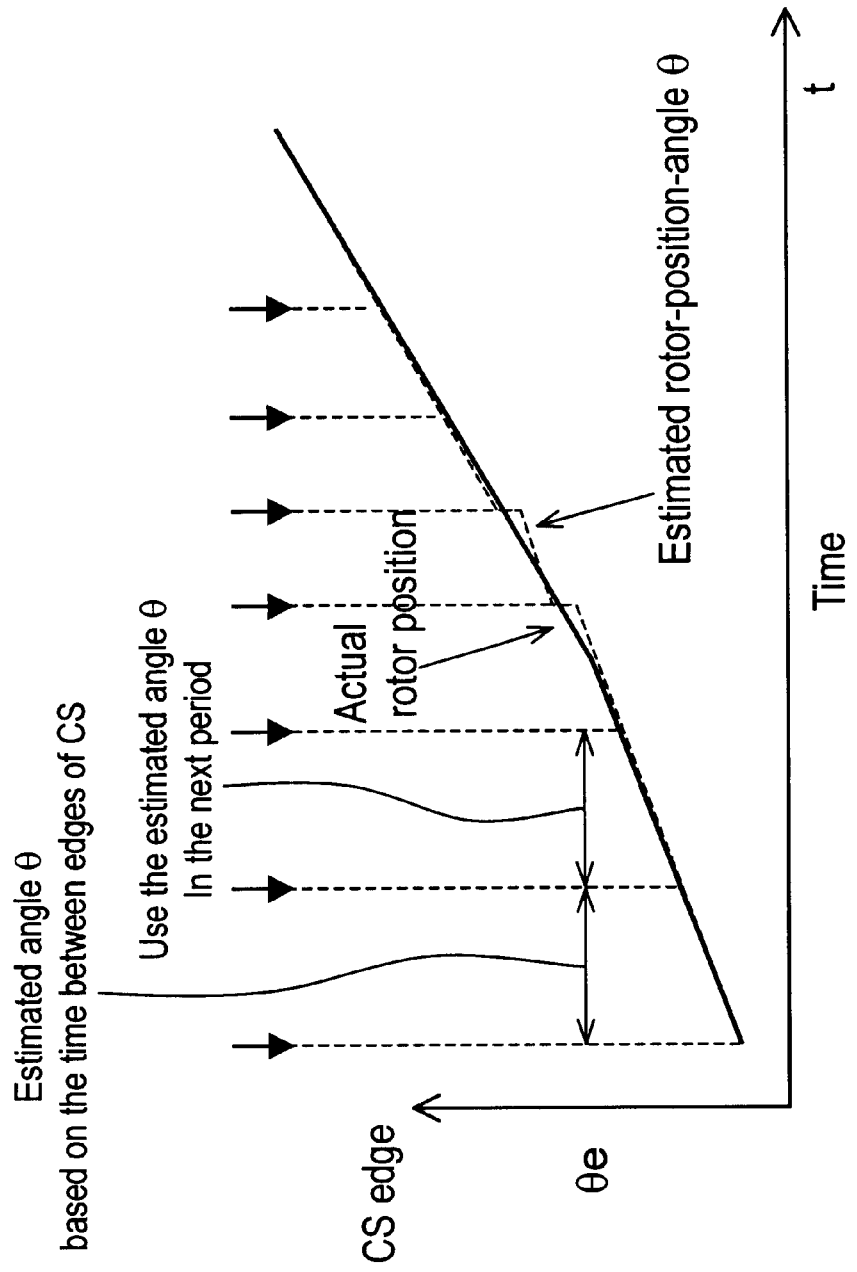
FIG. 4 schematically describes an operation of a motor of the controller shown in FIG. 3.

FIG. 3 is a block diagram illustrating a motor controller in accordance with the second exemplary embodiment of the present invention. FIG. 4 schematically describes an operation of a motor of the same controller.

The second embodiment differs from the first one in the following point: In the second embodiment, phase reseter 13 is provided instead of phase limiter 11 used in the first embodiment. To be more specific, phase reseter 13 is placed between pole-position-detector 8 and pole-phase-detector 10. Other structures stay the same as the first embodiment.

The operation of the second embodiment is demonstrated with reference to FIG. 4. When the motor speed is abruptly accelerated due to external force or back rush by the gear, a CS signal pattern is input to position detector 8 earlier than an expected time. If nothing is happened at this time, pole-phase-detector 10 incrementally adds an angle found based on speed ω every PWM cycle regardless of supply of CS signals. Therefore estimated angle θe becomes largely different from an actual rotor-position-angle. As a result, torque vibration occurs, and the motor results in uncontrollable. In this case, phase reseter 13 outputs an instruction to phase-detector 10 such as angle θp detected by position detector 8 based on CS signals should be estimated angle θe. Thus the motor can be driven at an exact rotor-position-angle.

As discussed above, in the second embodiment, phase reseter 13 is provided. Reseter 13 resets angle θe supplied from phase detector 10 to next output angle θp when CS signals to be a next CS pattern is input to position detector 8 in the condition of estimated angle θe<θp+60 degree. This structure allows an inexpensive and strong CS to drive the motor in a sine wave mode, and torque ripple can be lowered. In a geared motor encountering back rush between gears, the phase reseter allows the motor to be driven in a stable manner.

Third Exemplary Embodiment

Figure 5:
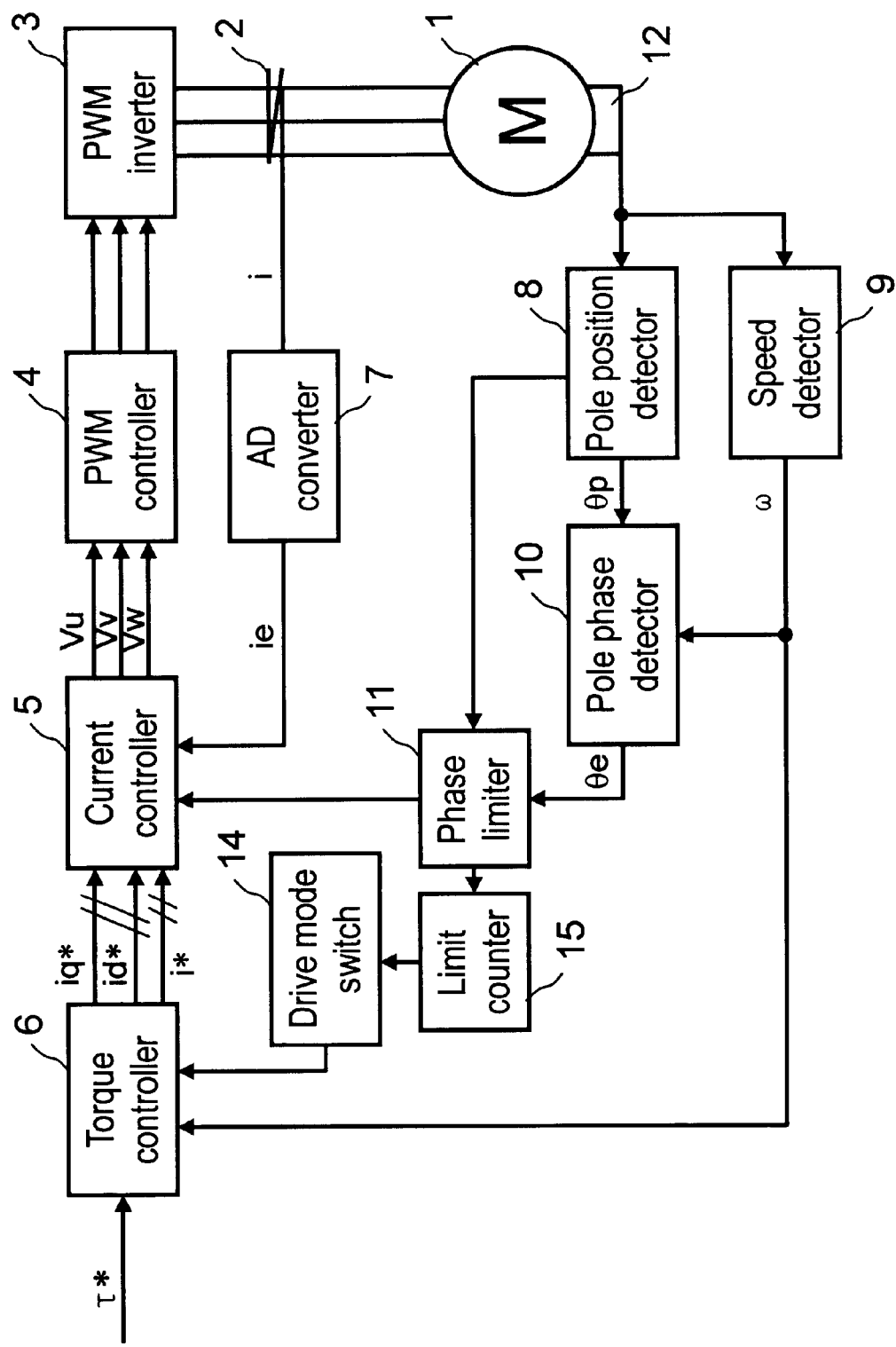
FIG. 5 is a block diagram illustrating a motor controller in accordance with a third exemplary embodiment of the present invention.
Figure 6:
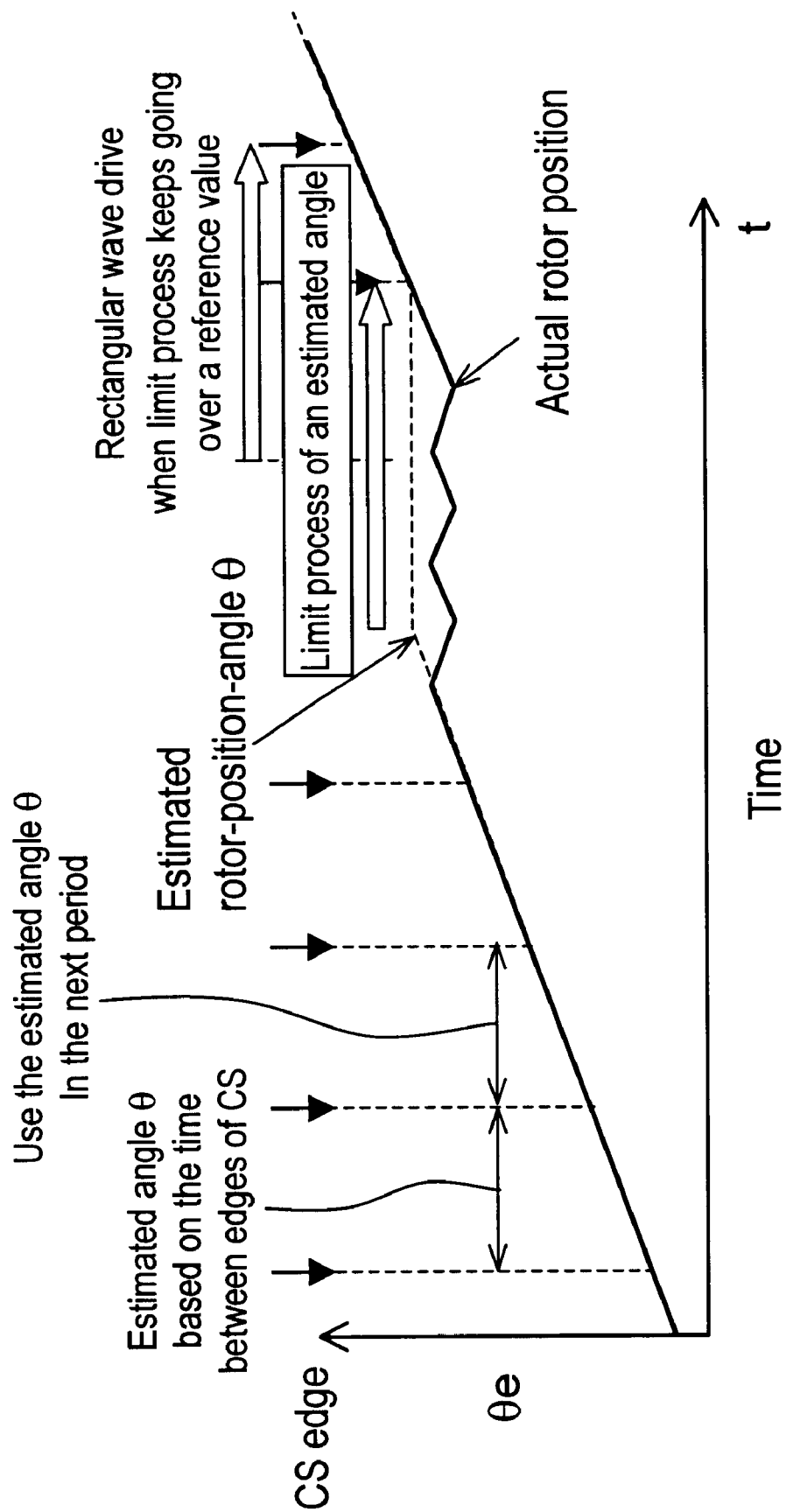
FIG. 6 schematically describes an operation of a motor of the controller shown in FIG. 5.

FIG. 5 is a block diagram illustrating a motor controller in accordance with the third exemplary embodiment of the present invention. FIG. 6 schematically describes an operation of a motor of the same controller.

The third embodiment differs from the first embodiment in the following point: In this third embodiment, limit counter 15 and drive-mode-switch 14 are additionally provided to the first embodiment. Counter 15 counts the time while restraining operation by phase-limiter 11 keeps on going. Switch 14 receives a signal from counter 15 and outputs a signal-switching sine-wave-drive to rectangular-wave-drive-to torque controller 6.

The operation of the third embodiment is demonstrated with reference to FIG. 6. When the motor speed is abruptly reduced due to external force or back rush by the gear disposed on an output shaft of the motor, a CS pattern signal is not input to pole position detector 8 for a period longer than an expected period. If nothing is happened in this case, pole-phase-detector 10 incrementally adds an angle found based on speed ω every PWM cycle regardless of supply of CS signals. Thus estimated angle θe becomes largely different from an actual rotor-position-angle. As a result, torque vibration occurs, and the motor results in uncontrollable. In this case, phase limiter 11 is set so that estimated position angle θe is prevented from advancing excessively. When CS signals are not input to position detector 8 although the limiter operates longer than a reference value, counter 15 outputs a signal, which switches the motor from sine wave driving to rectangular wave driving, to drive-mode-switch 14. In the rectangular wave driving mode, the motor produces a little vibration; however, the motor can be driven in a stable manner only with pole position information of the CS signals.

The third embodiment proves that the structure discussed above allows an inexpensive and strong CS to drive the motor in a sine wave mode, and torque ripple can be lowered. In a geared motor encountering back rush between the gears, this structure allows the motor to be driven in a stable manner. This structure includes counter 15 which counts the time while limiter 11 keeps on going, and when the counted value exceeds the reference value, the driving mode is switched from sine wave driving mode to rectangular wave driving mode.

Fourth Exemplary Embodiment

Figure 7:
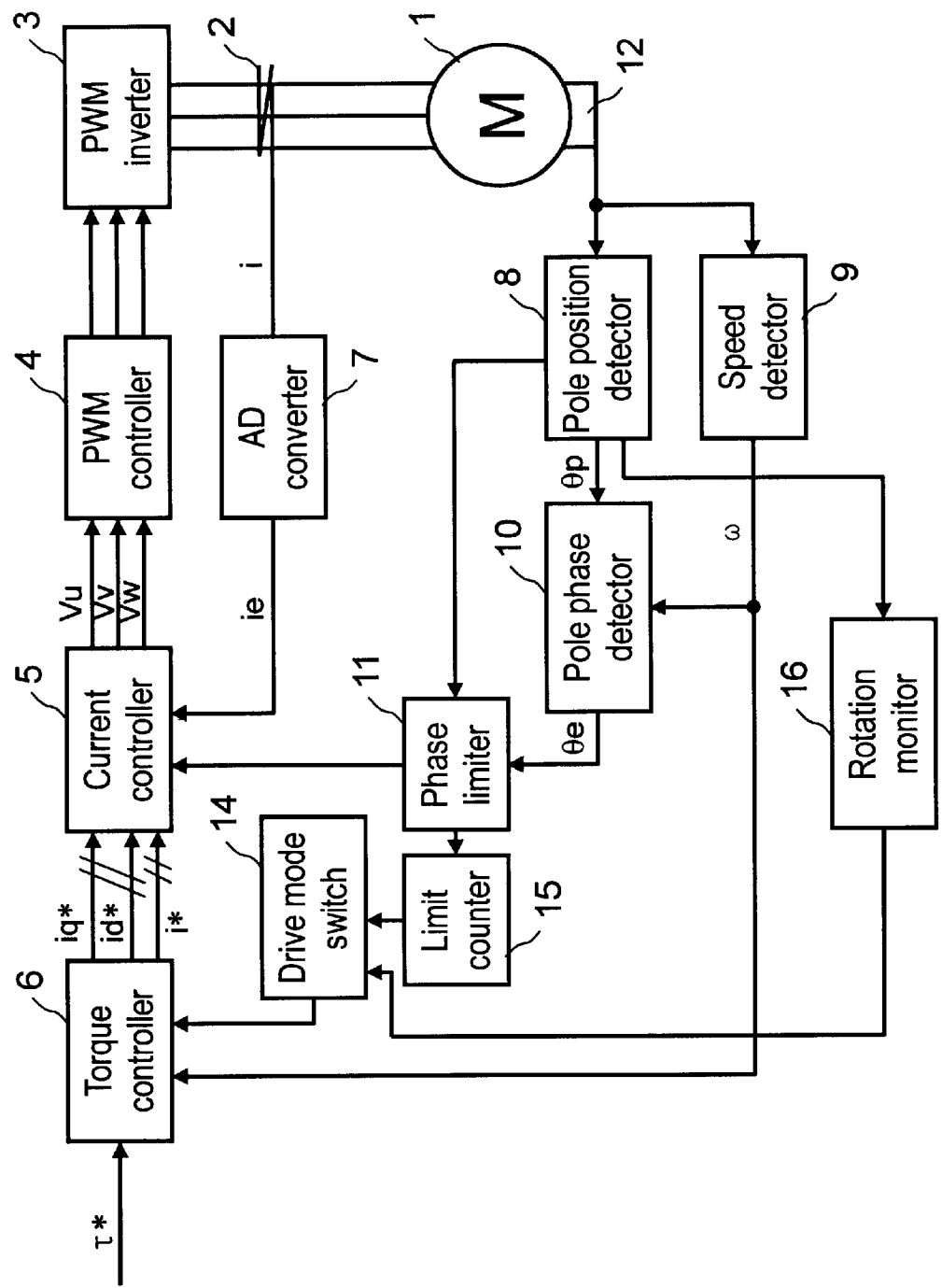
FIG. 7 is a block diagram illustrating a motor controller in accordance with a fourth exemplary embodiment of the present invention.
Figure 8:
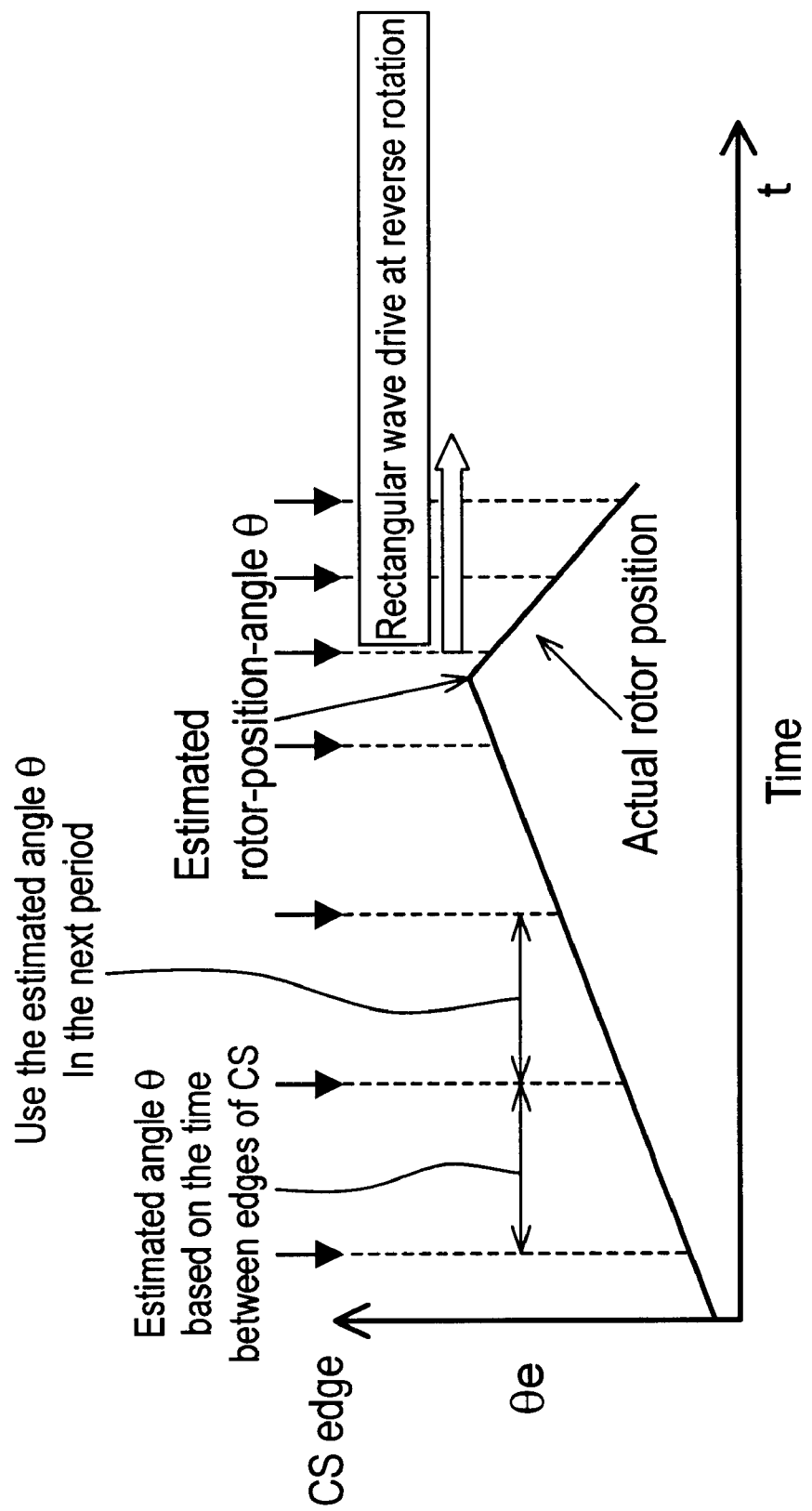
FIG. 8 schematically describes an operation of a motor of the controller shown in FIG. 7.

FIG. 7 is a block diagram illustrating a motor controller in accordance with the fourth exemplary embodiment of the present invention. FIG. 8 schematically describes an operation of a motor of the same controller.

The fourth embodiment differs from the third one in the following point: In the fourth embodiment, rotation monitor 16 is additionally disposed between pole position detector 8 and drive mode switch 14. Monitor 16 stores information about rotating status including a rotating direction of the motor and so on receiving signals from position detector 8.

The operation of this fourth embodiment is demonstrated hereinafter with reference to FIG. 8. A motor speed is changed abruptly due to external force or back rush by the gear, and the motor is instantaneously reversed. This is informed monitor 16 with CS patterns. If nothing happens in this case, it is difficult to estimate an exact estimated rotor-position-angle θe, then vibration occurs and the motor cannot be controlled. This is the same as the third embodiment. In this case, monitor 16 of the fourth embodiment detects that a rotating direction is reversed, and outputs a signal, which changes a motor-drive-mode from sine wave drive to rectangular wave drive, to drive-mode-switch 14. The rectangular wave drive produces a little vibration; however, the motor can be driven in a stable manner only with information of pole position based on the CS signals.

In the fourth embodiment as discussed above, monitor 16 for monitoring motor's rotating status is provided, and when the motor is reversed, switch 14 functions to change sine-wave-drive to rectangular-wave-drive. This structure allows an inexpensive and strong CS to drive the motor in a sine wave mode, and torque ripple can be lowered. In a geared motor encountering back rush between the gears, this structure allows the motor to be driven in a stable manner.

Fifth Exemplary Embodiment

Figure 9:
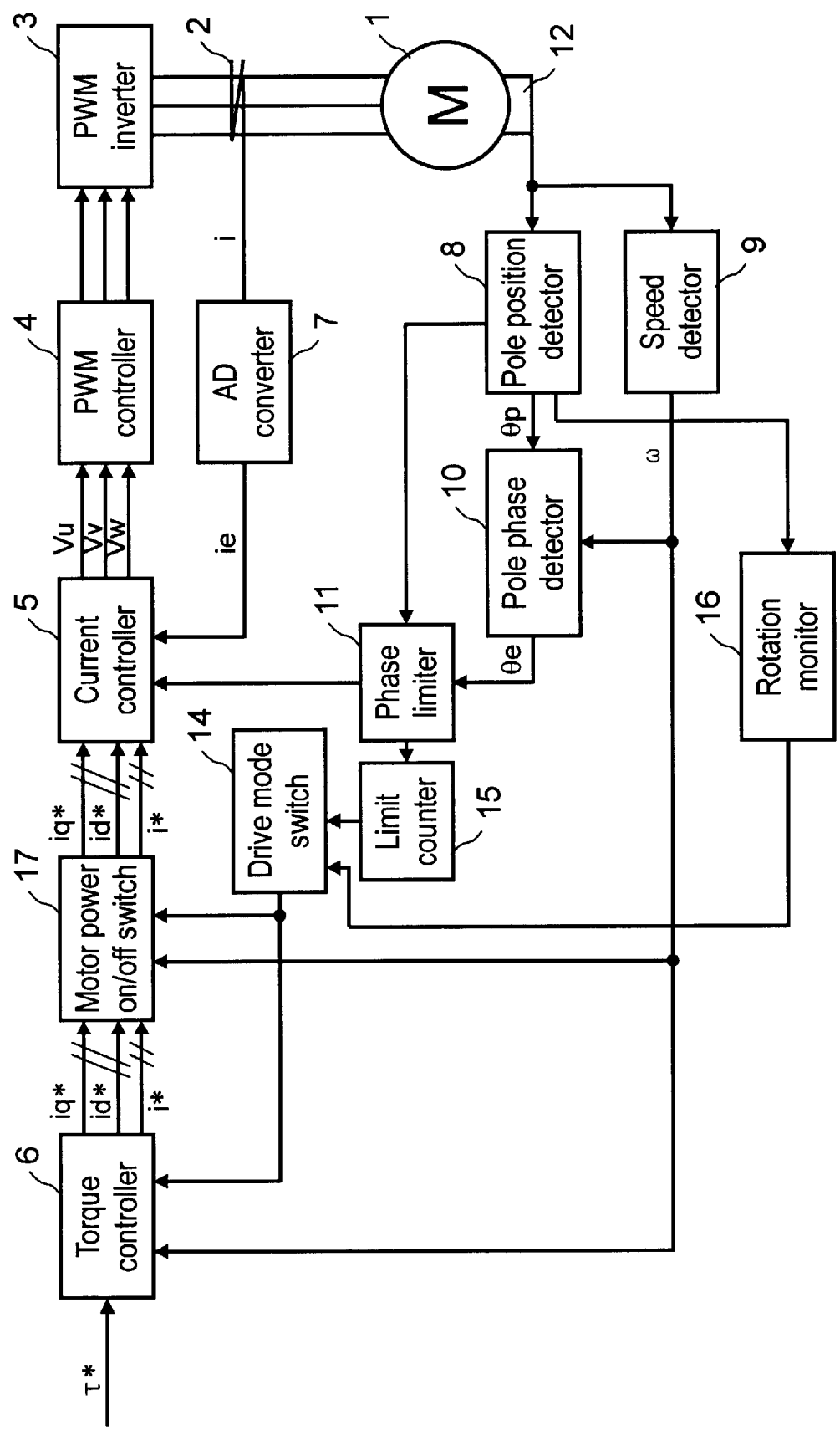
FIG. 9 is a block diagram illustrating a motor controller in accordance with a fifth exemplary embodiment of the present invention.

FIG. 9 is a block diagram illustrating a motor controller in accordance with the fifth exemplary embodiment of the present invention. This fifth embodiment differs from the first, third and fourth embodiments in the following point: In the fifth embodiment, motor on/off switch 17 is additionally provided between torque controller 6 and current controller 5. Motor on/off switch 17 powers on or powers off the motor.

In the meanwhile, a motor for driving an electric vehicle needs both of high torque in low speed range and high speed in low torque range. For this kind of motor, a control method of weakening field is generally employed. This field-weakening control method flows current on d-axis side thereby reducing the field magnets, so that the motor can be driven up to higher speed.

When a motor speed changes abruptly due to external force or back rush by the gear, a drive mode is switched, i.e., from the drive using an estimated rotor-position-angle detected by pole-phase-detector 10 to the drive using a pole position detected by pole-position-detector 8. In this case, the motor operating in an area under the field-weakening control requires d-axis current. However, in the drive using the pole position detected by position detector 8, the d-axis current cannot flow, which makes the motor uncontrollable.

When the motor operates in the area under the field-weakening control, motor on/off switch 17 performs the following operation: When on/off switch 17 receives a switch instruction signal from drive-mode-switch 14, on/off switch 17 powers off the motor to reduce the speed down to a given rpm, then powers on again. The rpm at which the motor is powered on is an rpm where motor's back electromotive force is lower than a dc voltage applied to inverter 3.

In the fifth embodiment as discussed above, motor on/off switch 17 is provided. When switch 14 is activated to the motor operating under field weakening control, on/off switch 17 controls the power on/off of the motor as discussed above at switching the drive mode from the drive using the estimated position angle to the drive using the pole position. This structure allows an inexpensive and strong CS to drive the motor in a sine wave mode, and torque ripple can be lowered. In a geared motor encountering back rush between the gears, this structure allows the motor to be driven in a stable manner.

Sixth Exemplary Embodiment

Figure 10:
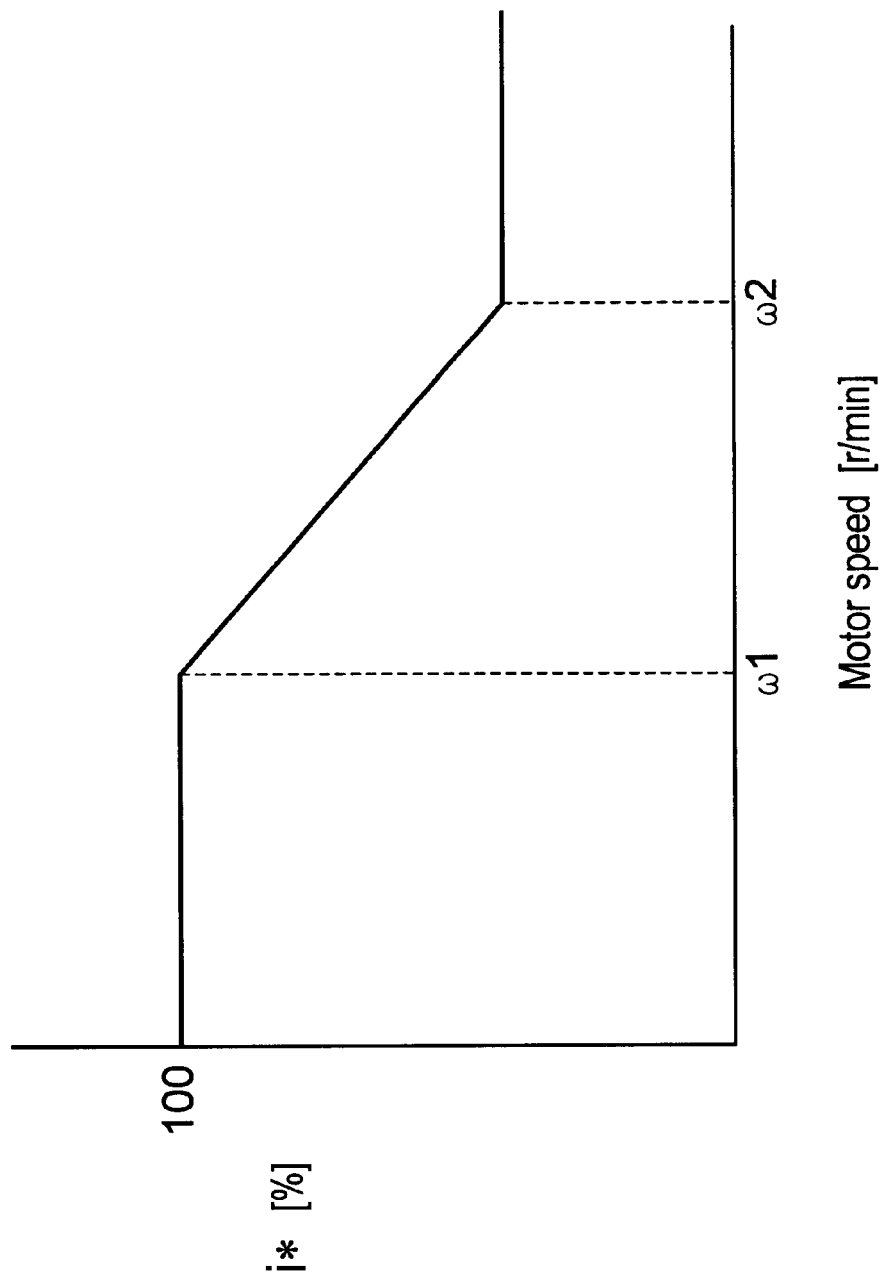
FIG. 10 schematically depicts how a current is restrained by a motor controller in accordance with a sixth exemplary embodiment of the present invention.

FIG. 10 schematically depicts how current is restrained by a motor controller in accordance with the sixth exemplary embodiment of the present invention.

The sixth embodiment differs from the fifth one in the following point: In this sixth embodiment, as shown in FIG. 10, a maximum limit of current designated is set depending on a motor speed. When the motor speed is changed abruptly due to external force or back rush by the gear and the motor operates under field weakening control, the drive mode is switched from using an estimated rotor-position-angle detected by the pole-phase-detector to using a pole-position detected by the pole-position-detector. In this case, the motor is not powered off but motor current is restrained thereby keeping on outputting torque. This structure allows an inexpensive and strong CS to drive the motor in a sine wave mode, and torque ripple can be lowered. In a geared motor encountering back rush between the gears, this structure allows the motor to be driven in a stable manner.

Seventh Exemplary Embodiment

Figure 11:
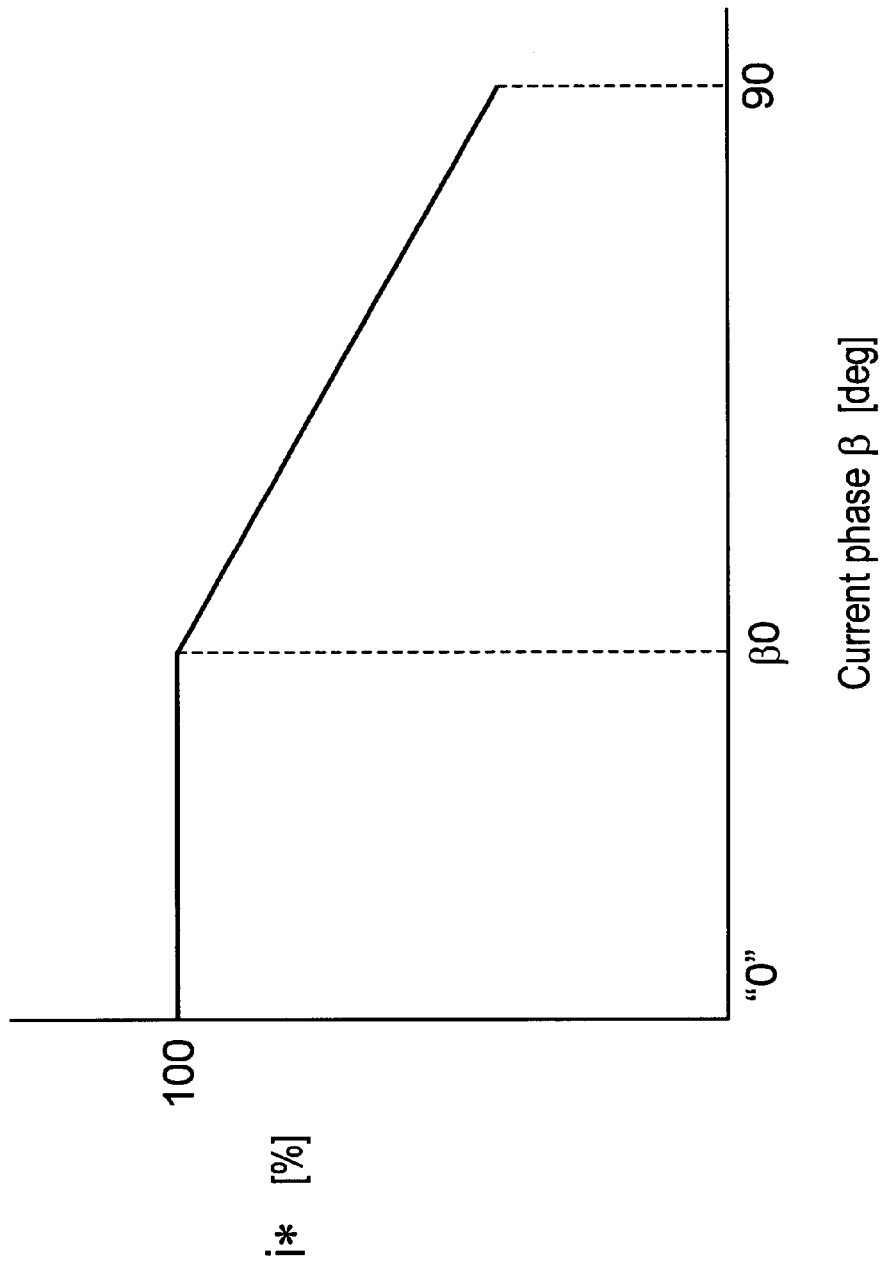
FIG. 11 schematically depicts how a current is restrained by a motor controller in accordance with a seventh exemplary embodiment of the present invention.

FIG. 11 schematically depicts how a current is restrained by a motor controller in accordance with the seventh exemplary embodiment of the present invention.

The seventh embodiment differs from the sixth one in the following point: In the seventh embodiment, as shown in FIG. 11, a maximum limit of current designated is provided depending on current phase β at sine-wave-driving. β0 is a current phase point where a driving status enters to the field weakening control. When the motor speed is changed abruptly due to external force or back rush by the gear and the motor operates under field weakening control, the drive mode is switched from using an estimated rotor-position-angle detected by the pole-phase-detector to using a pole-position detected by the pole-position-detector. In this case, the motor is not powered off but motor current is restrained thereby keeping on outputting torque. This structure allows an inexpensive and strong CS to drive the motor in a sine wave mode, and torque ripple can be lowered. In a geared motor encountering back rush between the gears, this structure allows the motor to be driven in a stable manner.

Eighth Exemplary Embodiment

Figure 12:
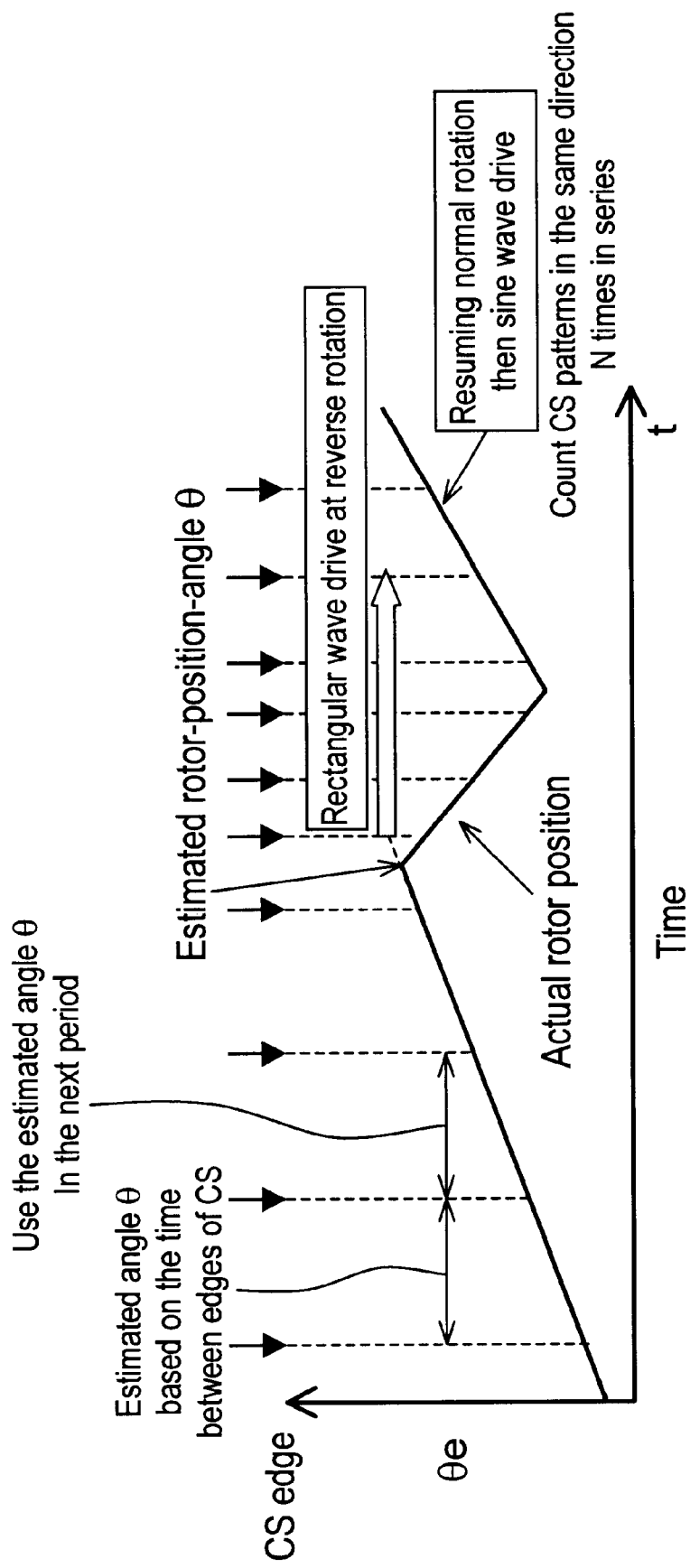
FIG. 12 schematically describes an operation of a motor of a motor controller in accordance with an eighth exemplary embodiment of the present invention.
Figure 13:
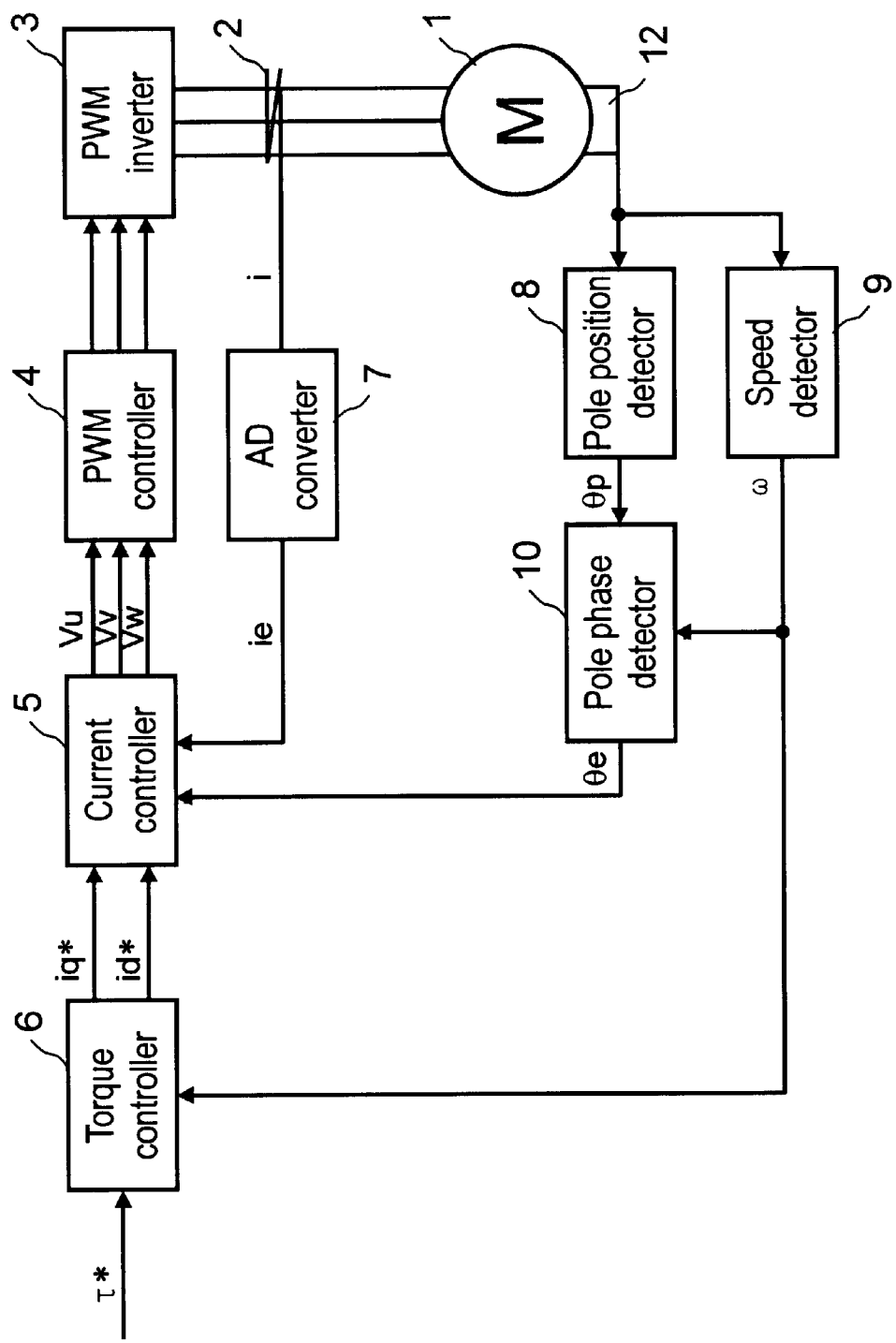
FIG. 13 is a block diagram illustrating a conventional motor controller.
Figure 14:
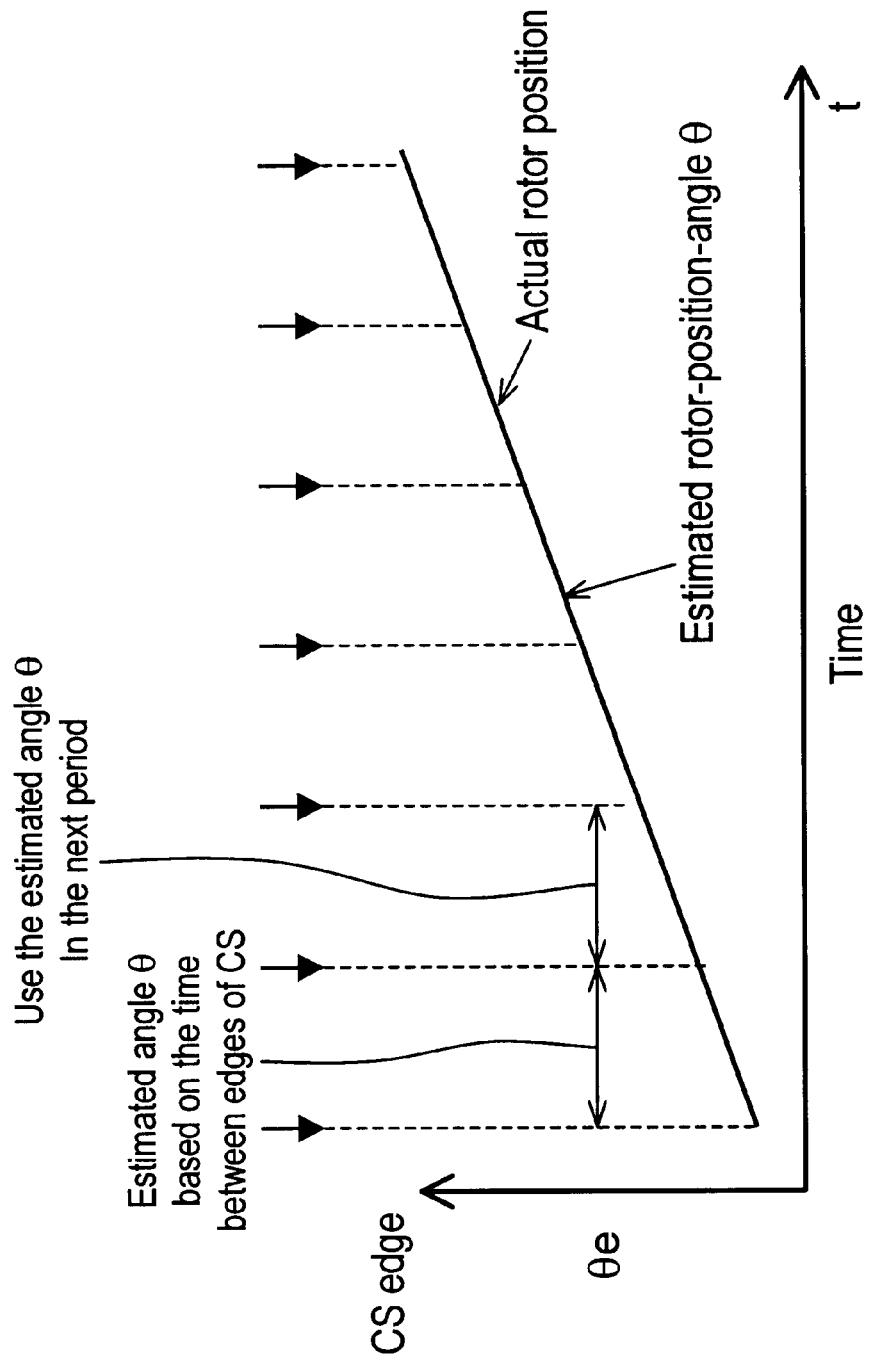
FIG. 14 schematically describes an operation of a motor of the controller shown in FIG. 13.

FIG. 12 schematically describes an operation of a motor of a motor controller in accordance with the eighth exemplary embodiment of the present invention.

The structure of the motor controller used in the eighth embodiment is the same as the block diagram shown in FIG. 9. In the eighth embodiment, as shown in FIG. 12, when a motor speed is changed abruptly due to external force or back rush by the gear disposed on an output shaft of the motor and the information of a CS pattern containing instantaneous reverse of rotating direction is supplied to pole-position-detector 8, drive-mode-switch 14 switches the mode from sine-wave drive to rectangular-wave drive. Thus the motor starts driving in a stable manner again. In the same condition, i.e., when the motor speed is changed abruptly and phase limiter 11 activates limit counter 15 to changed abruptly and phase limiter 11 activates limit counter 15 to count over a reference value, mode switch 14 switches the driving mode as discussed above. Thus the motor starts driving in a stable manner again.

Further, when rotational direction and rpm of the motor become stable, rotation monitor 16 outputs a signal, which switches rectangular wave drive to sine wave drive, to mode switch 14. When position detector 8 supplies CS patterns indicating the same rotational direction in "n" times (n≧1) or counter 15 stops operating, the driving condition can be determined stable.

In the eighth embodiment, as discussed above, monitor 16 confirms that the motor becomes stable in rotation, and switch 14 switches the rectangular wave driving to the sine wave driving. This structure allows an inexpensive and strong CS to drive the motor in a sine wave mode, and torque ripple can be lowered. In a geared motor encountering back rush between the gears, this structure allows the motor to be driven in a stable manner.

What is claimed is:

1. A motor controller for driving a motor based on signals from commutation sensors (hereinafter referred to as CS signals), said controller comprising:
   (a) a pole position detector for detecting a pole position of a rotor with edges of the CS signals;
   (b) a speed detector for detecting a speed of the motor with a time interval between the edges of the CS signals;
   (c) a pole phase detector for estimating a position angle of the rotor based on an output from said pole position detector and an output from said speed detector; and
   (d) a phase limiter for restraining an estimated position angle of the rotor from advancing over a given value when the motor abruptly reduces a speed thereof.

2. A motor controller for driving a motor based on signals from commutation sensors (hereinafter referred to as CS signals), said controller comprising:
   (a) a pole position detector for detecting a pole position of a rotor with edges of the CS signals;
   (b) a speed detector for detecting a speed of the motor with a time interval between the edges of the CS signals;
   (c) a pole phase detector for estimating a position angle of the rotor based on an output from said pole position detector and an output from said speed detector; and
   (d) a phase reseter for correcting deviation of an estimated position angle of the rotor when the motor accelerates a speed thereof.

3. The motor controller as defined in claim 1 further comprising:
   a limit counter for measuring a time interval during which said phase limiter operates; and
   a drive mode switch for designating motor driving to one of sine wave driving and rectangular wave driving,
   wherein when said limit counter counts over a reference value, said switch switches the motor driving from the sine wave driving to the rectangular wave driving.

4. A motor controller for driving a motor based on signals from commutation sensors (hereinafter referred to as CS signals), said controller comprising:
   (a) a pole position detector for detecting a pole position of a rotor with edges of the CS signals;
   (b) a rotation monitor for recognizing rotating status of the motor based on a pattern of the CS signals;
   (c) a drive mode switch for designating motor driving to one of sine wave driving and rectangular wave driving,
   wherein when said rotation monitor recognizes a reverse rotational direction, said switch switches the motor driving from the sine wave driving to the rectangular wave driving.

5. The motor controller as defined in claim 3 further comprising:
   a motor power on/off switch for powering on/off the motor,
   wherein when said drive mode switch operates to the motor operating under field weakening control, said mode switch instructs said on/off switch to power off the motor, which is driven using an estimated rotor position angel detected by said pole-phase-detector, and reduces a speed of the motor down to a given rpm then power on again, and switches the motor driving to a mode using a pole position detected by said pole-position-detector.

6. The motor controller as defined in claim 4 further comprising:
   a speed detector for detecting a speed of the motor based on a time interval between the edges of the CS signals;
   a pole phase detector for estimating a position angle of the rotor based on an output from said pole position detector and an output from said speed detector; and
   a motor power on/off switch for powering on/off the motor,
   wherein when said drive mode switch operates to the motor operating under field weakening control, said drive mode switch instructs said on/off switch to power off the motor, which is driven using an estimated rotor position angel detected by said pole-phase-detector, and reduces a speed of the motor down to a given rpm then power on again, and switches the motor driving to a mode using a pole position detected by said pole-position-detector.

7. The motor controller as defined in claim 5, wherein a maximum limit (restrained current value) of current designated is set for a driving mode using a pole position detected by said pole detector,
   wherein in this current setting, when said drive mode switch operates to the motor operating under field weakening control and a driving mode is switched from a mode using a pole phase detected by said pole-phase-detector to a mode using a pole position detected by said pole-position-detector, the restrained current value is found by using the pole position detected by said pole-position-detector.

8. The motor controller as defined in claim 6, wherein a maximum limit (restrained current value) of current designated is set for a driving mode using a pole position detected by said pole detector, wherein in this current setting, when said drive mode switch operates to the motor operating under field weakening control and a driving mode is switched from a mode using a pole phase detected by said pole-phase-detector to a mode using a pole position detected by said pole-position-detector, the restrained current value is found by using the pole position detected by said pole-position-detector.

9. The motor controller as defined in claim 7, wherein the restrained current value is calculated with a motor speed.

10. The motor controller as defined in claim 8, wherein the restrained current value is calculated with a motor speed.

11. The motor controller as defined in claim 7, wherein the restrained current value is calculated with a current phase carrying out the field weakening control.

12. The motor controller as defined in claim 8, wherein the restrained current value is calculated with a current phase carrying out the field weakening control.

13. The motor controller as defined in claim 3 further comprising a rotation monitor for recognizing rotating status of the motor based on a pattern of the CS signals;

wherein when said monitor confirms that the time interval between the edges of the CS signals becomes stable, said phase limit counter is reset, and said drive mode switch switches a drive mode from the rectangular wave driving to the sine wave driving mode.

14. The motor controller as defined in claim 4, wherein when said monitor confirms that the time interval between the edges of the CS signals becomes stable, said phase limit counter is reset, and said drive mode switch switches a drive mode from the rectangular wave driving to the sine wave driving mode.

15. The motor controller as defined in claim 1, wherein said controller is employed in an electric vehicle.

16. The motor controller as defined in claim 2, wherein said controller is employed in an electric vehicle.

17. The motor controller as defined in claim 4, wherein said controller is employed in an electric vehicle.

18. The motor controller as defined in claim 1, wherein the motor is a geared motor.

19. The motor controller as defined in claim 2, wherein the motor is a geared motor.

20. The motor controller as defined in claim 4, wherein the motor is a geared motor.

* * * * *